United States Patent
Frederick et al.

(10) Patent No.: US 7,873,121 B2
(45) Date of Patent: Jan. 18, 2011

(54) OVERSAMPLING AND DIGITALLY FILTERING RFID SIGNALS

(75) Inventors: Thomas J. Frederick, Chapel Hill, NC (US); James M. Schaffer, Raleigh, NC (US); Joseph P. Repke, Cary, NC (US)

(73) Assignee: Sirit Technologies, Inc., Toronto (CA)

( * ) Notice: Subject to any disclaimer, the term of this patent is extended or adjusted under 35 U.S.C. 154(b) by 887 days.

(21) Appl. No.: 11/741,651

(22) Filed: Apr. 27, 2007

(65) Prior Publication Data

US 2007/0291884 A1    Dec. 20, 2007

Related U.S. Application Data

(60) Provisional application No. 60/795,630, filed on Apr. 27, 2006.

(51) Int. Cl.
*H04L 27/00* (2006.01)

(52) U.S. Cl. .................................... 375/316

(58) Field of Classification Search ................ 375/316, 375/350, 130, 147, 152; 340/10.1, 572.1; 708/300; 455/252.1
See application file for complete search history.

(56) References Cited

U.S. PATENT DOCUMENTS

| | | | |
|---|---|---|---|
| 2005/0094752 A1* | 5/2005 | Frahm et al. | 375/350 |
| 2007/0004361 A1* | 1/2007 | Srinivasan et al. | 455/252.1 |
| 2007/0156799 A1* | 7/2007 | Gilbert | 708/300 |

OTHER PUBLICATIONS

Eugene Hogenauer, "*An Economical Class of Digital Filters for Decimation and Interpolation*", IEEE Transaction Acoustics, Speech and Signal Processing, Apr. 1981 (8 pages).

Yong Ching Lim and Rui Yang, "*On the Synthesis of Very Sharp Decimators and Interpolators Using the Frequency-Response Masking Technique*", Apr. 2005 (11 pages).

* cited by examiner

*Primary Examiner*—Khai Tran
(74) *Attorney, Agent, or Firm*—Fish & Richardson P.C.

(57) ABSTRACT

The disclosure includes a system and method for oversampling and digitally filtering RFID signals. In some implementations of the present disclosure, an RF receiver includes an ADC, a comb filter, and a mask filter. The ADC is operable to directly sample an RF signal independent of a band pass filter and convert the RF signal to a digital signal. The RF signal is sampled at a rate greater than or equal to 60 MHz. The comb filter is coupled to the ADC. The mask filter is coupled to the comb filter. The comb filter and frequency mask filter are configured to filter out-of-band noise in the digital signal.

20 Claims, 4 Drawing Sheets

OVERSAMPLING AND DIGITALLY FILTERING RFID SIGNALS

CLAIM OF PRIORITY

This application claims priority under 35 USC §119(c) to U.S. patent application Ser. No. 60/795,630, filed on Apr. 27, 2006, the entire contents of which are hereby incorporated by reference.

TECHNICAL FIELD

This invention relates to Radio Frequency IDentification (RFID) readers and, more particularly, to oversampling and digitally filtering RFID signals.

BACKGROUND

In some cases, an RFID reader operates in a dense reader environment, i.e., an area with many readers sharing fewer channels than the number of readers. Each RFID reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. At the same time other nearby readers also transmit 1 watt, sometimes on the same channel or nearby channels. Although the transponder backscatter signal is, in some cases, separated from the readers' transmission on a sub-carrier, the problem of filtering out unwanted adjacent reader transmissions is very difficult.

SUMMARY

The disclosure includes a system and method for oversampling and digitally filtering RFID singles. In some implementation of the present disclosure, an RF receiver includes an Analog-to-Digital Converter (ADC), a comb filter, and a mask filter. The ADC is operable to directly sample an RF signal independent of a band pass filter and convert the RF signal to a digital signal. The RF signal is sampled at a rate greater than or equal to 60 MHz. The comb filter is coupled to the ADC. The mask filter is coupled to the comb filter. The comb filter and frequency mask filter are configured to filter out-of-band noise in the digital signal.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
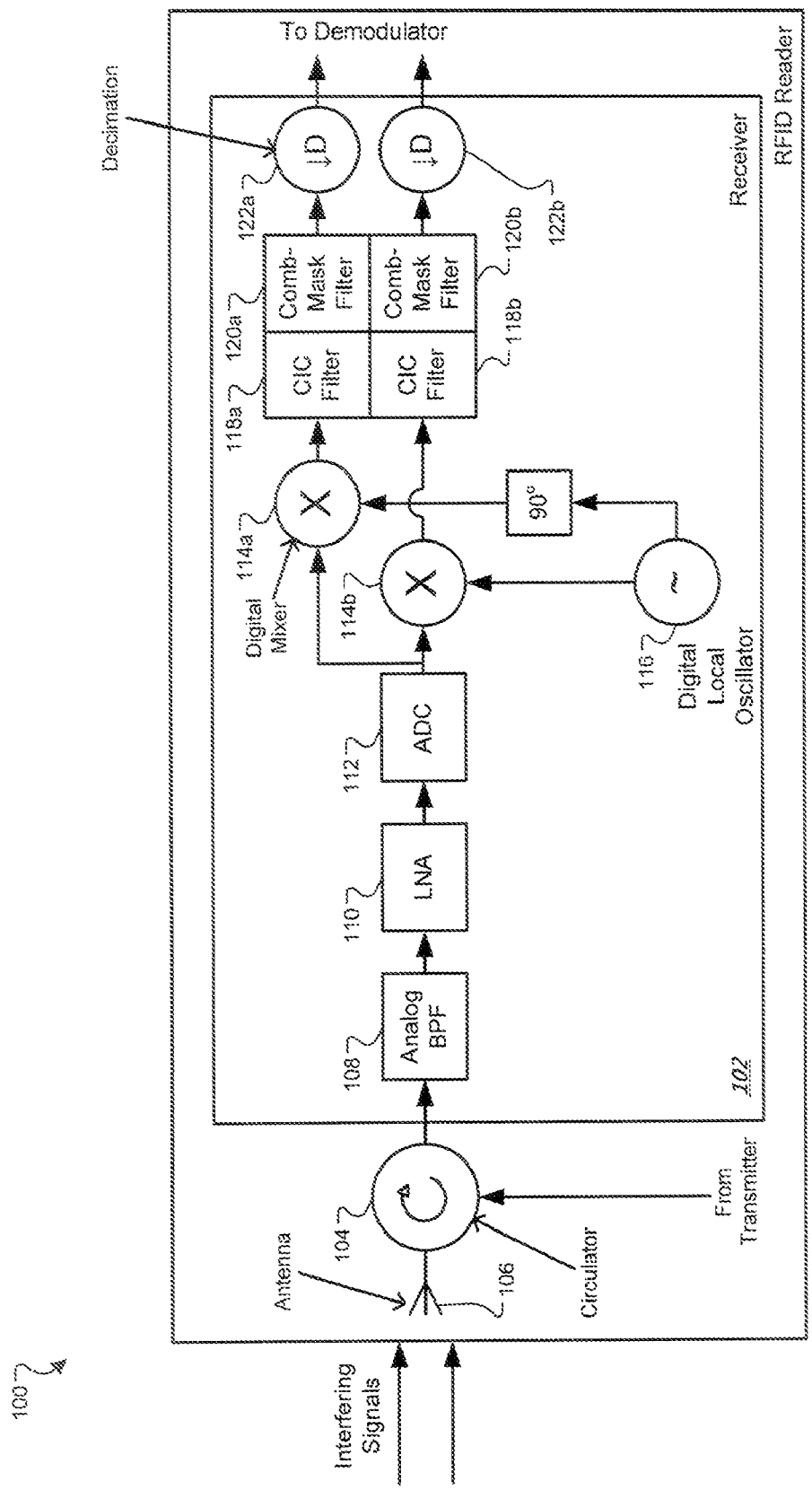
FIG. 1 is a block diagram illustrating an example RFID reader in accordance with some implementations of the present disclosure.

FIG. 1 is an example RFID reader 100 for filtering signals from adjacent RFID readers in accordance with some implementations of the present disclosure. For example, the receiver 102 may oversample and digitally filter received signals to filter spectral proximate signals (e.g., 100 MHz) with large power spectrums relative to a desired channel. Oversampling is frequently the process of sampling a signal (e.g., RF signal, DC signal, low frequency signal) with a sampling frequency greater than twice the bandwidth or highest frequency of the signal being sampled. RFID readers, such as reader 100, scans associated interrogation zone for transponders (not illustrated) to identify information stored in the transponders. In some implementations, the transponder uses radar cross section (RCS) modulation to backscatter information to the readers, and as a result, the RFID communications link can be asymmetric. For example, RFID readers can transmit around 1 watt, while only about 0.1 milliwatt or less gets reflected back from the transponder to the readers. In this case, the receive signal power can be 1 nanowatt for fully passive transponders and as low as 1 picowatt for battery assisted transponders after propagation loss. In addition, readers nearby the reader 100 may also transmit 1 watt signals on the same channel or nearby channels. To overcome interference generated from nearby readers, the reader 100 can, by some combination of analog filtering and digital filtering, implement a highly frequency selective, low shape factor receive filter to substantially reduce such interference. It can be expensive to implement such a low shape factor receive filter in analog circuitry, so reader 100 may sample the received signal and perform some part of the receive filtering digitally. Sampling can result in distortion and reduced dynamic range due to aliasing and quantization noise. The reader 100 can oversample the receive signal to reduce the effects of aliasing and quantization noise. When using a high oversampling rate, time-bandwidth limitations of filters can lead to expensive and/or complex digital filter implementations. The reader 100 may digitally filter the signal using a comb filter and a mask filter to minimize, eliminate, or otherwise reduce such impairments to frequency selectivity. In some implementations, oversampling in combination with a comb-mask filter can improve frequency selectivity in a cost effective manner.

In general, the RFID reader 100 typically includes a local oscillator tuned to channel N, transmitting commands on channel N and listening for lower sideband and upper sideband transponder responses between channels N-1 and N and between channels N and N-1, respectively. In addition to these responses transmitted in the side bands, other nearby readers are also interrogating for transponders on any or all of these channels, and their transmissions can appear as interference with respect to the reader 100. As mentioned above, these interfering reader transmissions can be several orders of magnitude stronger than the transponder backscatter signal. For example, the interfering reader signals can be received at levels in excess of 0.1 milliwatts or 100,000 times more power than a weak passive transponder and 100,000,000 more power than a weak battery assisted transponder. To provide good frequency selectivity in such environments, the reader 100 can oversample the receive signal and digitally filter using a comb-mask filter.

In some implementations of the present disclosure, the reader 100 includes a receiver module 102, a circulator 104, and an antenna 105. The reader 100 can also include other elements associated with signal processing and/or transmission (not illustrated). The antenna 106 is configured to receive signals from and/or transmit signals to transponders using Radio Frequency (RF) signals. In the case the reader 100 transmits an RF signal, the circulator 104 directs the RF signal to the antenna 106. In the case the antenna 106 receives an RF signal, the circulator 104 directs the RF signal to the receiver module 102. While the reader 100 is a "mono-static" design, i.e., readers in which the transmitter and receiver share the same antenna, the disclosure also applies to "bi-static" designs, i.e., readers which use separate antennas for transmit and receive.

The receiver module 102 can include any software, hardware, and/or firmware configured to filter RF signals spectrally proximate to a desired channel (or sub-channel). For example, the receiver module 102 may oversample the received signal in combination with filtering the signal with a comb filter and a mask filter to reduce the interfering RF signals. In some implementations, the comb filter and the mask filter may be combined into a single filter that performs both associated functions. The illustrated receiver module 102 includes an analog Band Pass Filter (BPF) 108, a low noise amplifier (LNA) 110, an Analog-to-Digital Converter (ADC) 112, digital mixers 114a and 114b, a digital oscillator 116, cascade integrated comb (CIC) filters 118a and 118b, comb-mask filters 120a, and decimators 122a. At a high level, the analog BPF 108 receives RF signals and passes a band of the received RF signals to the LNA 110 while substantially rejecting frequencies out of band. The LNA 110 amplifiers the passed RF signal in light of the relative weakness of the signal to the transmission signals. The ADC 112 converts the analog signal to a digital signal and, in this implementation, directly samples the RF signal. In the case the ADC 112 is configured to sampling rates greater than 60 MHz (e.g., 244 MHz), the reader 100 may reduce the complexity of the analog BPF 108. In some cases, oversampling substantially reduces aliasing distortion by spectrally separating, from the desired channel, image signals generated from sampling process in the ADC 112. The mixers 114a and 114b in combination with the digital local oscillator 116 down convert the RF signal to two baseband signals such as an in-phase signal and a quadrature signal. In some implementations, the two baseband signals are low frequency signals. The CIC filters 118a and 118b decrease the sample size prior to passing the DC signals to the comb-mask filters 120a and 120b. In this case, the CIC filters 118a and 118b function as decimators. The comb-mask filters 120a and 120b lower the shape factor of the receive filtering by generating a comb structure in the frequency domain and pass the channel of interest while rejecting the other comb channels. The decimators 122a and 122b again reduce the sample rate of the signals prior to signal processing.

Turning to a more detailed description of the receiver module 102, the analog BPF 108 substantially filters the received RF signal and passes a band of the received RF signal while substantially rejecting out-of-band frequencies. In some implementations, the analog BPF 108 performs one or more of the following functions: limiting the required dynamic range of the ADC input signal and/or attenuating the image frequencies in the ADC input signal. The dynamic range can be determined based, at least in part, on the ratio of the highest power input signal to the lowest level signal associated with the desired channel. Frequently, a higher dynamic range can require a more expensive ADC. As mentioned above, the backscatter power level is relatively small compared to co-channel and adjacent channel interference. In some cases, the difference can be several orders of magnitude. As a result, these interfering signals, in some implementations, can set the dynamic range/resolution requirements of the ADC 112. In addition, the relatively small frequency separation between channels can require a low shape factor for the combined analog and digital filtering in receiver 102 because much attenuation can be needed to resolve the desired channel (and thus highly complex analog BPF). For example, the transition bandwidth from transponder backscatter to adjacent channel or co-channel interference can be as low as 100 KHz. In some implementations, the analog BPF 108 can reduce image frequencies to a level below the requirements of the demodulator to operate satisfactorily (e.g., 15 dB below the transponder backscatter).

As mentioned above, the ADC 112 samples the RF signal at a specified rate and converts it to a digital signal. In some implementations, increasing the ADC sampling rate $F_s$ lowers the required specifications on the analog BPF 108 by increasing the spectral separation of the first image frequencies from the desired channel. In some implementations, each factor of 4 increase in the sampling rate can improve the effective resolution by one bit. The ADC 112 can, in some implementations, sample the input signal at a rate $F_S$ with signal-to-quantization noise ratio (SQNR) of $SNR_0$. By designating the final bandwidth as B and subject to the "whitening" conditions for quantization noise in over-sampled systems, the SQNR can be estimated as:

$$SNR_{out} = SNR_0 + 10 * \log_{10}\left(\frac{F_S}{B}\right)$$

after reducing the signal bandwidth to B. As indicated in this expression, over-sampling can reduce the specification requirements of the analog BPF 108. In some implementations, over-sampling can reduce requirements with respect to ADC dynamic range and/or analog anti-aliasing BPF.

As mentioned above, the comb-mask filters 118a and 118b lower the shape factor of the receiver filtering by generating a comb structure using the digital signals and passing the channel of interest while rejecting the other channels. In some implementations, the over-sampling factors of the ADC 112 and comb rates of the comb-mask filters 118a and 118b may be selected such that a family of comb-mask filters can satisfy a wide range of RFID modulation rates and formats. For example, the receiver module 102 can assume the ratio of the return sub-carrier frequency $F_{subc}$ and the over-sampling rate is a composite integer as indicated below:

$$N=N_1 \cdot N_2,$$

i.e., $$F_S=N_1 \cdot N_2 \cdot F_{subc}.$$

In this example, the receiver module 102 can estimate that the signal is to be converted to a sampling rate as follows:

$$F_2=N_2 \cdot F_{subc},$$

where the description will use $N_2=8$ without loss of generality. Common protocols used in RFID systems include FM0 (bi phase) and Miller encoding on a 2×, 4×, or 8× sub-carrier frequency. In some implementations, the receiver module 102 can receive various transponder backscatter protocols supported under EPC1 Generation-2 standard. The comb-mask filter can, in some implementations, include one or more of the following: FM0 comb-mask filters, Miller-2 comb-mask filters, Miller-4 comb-mask filters, Miller-8 comb-mask filters, and others.

In regards to FM0 comb-mask filters, the receiver module 120 can include a half-band low-pass prototype filter, $H_p(z^{-1})$. In this case, the comb-mask filter 129 can be applied to the data as a comb filter $H_p(z^{-N_1})$. The comb filtering can reduce the transition band of the prototype filter by a factor of $N_1$, thereby achieving narrow transition bands with relatively few coefficients. However, there are $N_1$ pass-bands in the comb response, and $N_1-1$ of them are undesirable (the low-pass "tooth" is the desired frequency band). In this example, the cut off frequency of the low-pass response of the comb is $$F_S/(4 \cdot N_1) = 2 \cdot F_L = B,$$

where B is the full bandwidth (100% excess raised cosine filter) of the signal. This is the purpose of the frequency masking filter. However, the transition band of the FIR filter can be estimated as follows:

$$\frac{F_S}{4} - 2B.$$

The output of the mask filter is decimated by $N_1$, which can further reduce the complexity of the mask filter by a factor of $N_1$ by using efficient FIR decimator implementations commonly known to those skilled in the art.

In regards to Miller-2 comb-mask filters, the full signal bandwidth can be expressed as $B = F_{subc} \pm F_{subc}/2$, which corresponds to a half band high pass prototype filter. Thus, a half-band high-pass prototype filter $H_p(z^{-1})$ can be used as a $4 \cdot N_1$ comb filter, e.g., $H_p(z^{-4 \cdot N_1})$. In this example, the $F_S/2$ center frequency of the high-pass can be translated down to $F_S/8 \cdot N_1 = F_S/N_2 \cdot N_1 = F_{subc}$. The transition band of the prototype filter can be reduced by $4 \cdot N_1$, and the transition bandwidth of the frequency mask filter can be estimated as $F_{subc} - 2 \cdot B$.

In regards to Miller-4 comb-mask filters, the full signal bandwidth can be expressed as $B = F_{subc} \pm F_{subc}/4$, which corresponds to a quarter band high pass prototype filter. Thus, a quarter-band high-pass prototype filter $H_p(z^{-1})$ can be implemented as a $4 \cdot N_1$ comb filter, e.g., $H_p(z^{-4 \cdot N_1})$. The $F_S/2$ center frequency of the high-pass gets translated down to $F_S/8 \cdot N_1 = F_S/N_2 \cdot N_1 = F_{subc}$. The transition band of the prototype filter can be reduced by $4 \cdot N_1$, and the transition bandwidth of the frequency mask filter can be estimated as $F_{subc} - 2 \cdot B$.

In regards to Miller-8 comb-mask filters, the full signal bandwidth can be expressed as $B = F_{subc} \pm F_{subc}/8$, which corresponds to an eighth band high pass prototype filter. Thus, a eighth-band high-pass prototype filter $H_p(z^{-1})$ can be implemented as a $4 \cdot N_1$ comb filter, e.g., $H_p(z^{-4 \cdot N_1})$. The $F_S/2$ center frequency of the high-pass gets can translate down to $F_S/8 \cdot N_1 = F_S/N_2 \cdot N_1 = F_{subc}$. The transition band of the prototype filter can be reduced by $4 \cdot N_1$, and the transition bandwidth of the frequency mask filter can be estimated as $F_{subc} - 2 \cdot B$.

Figure 2:
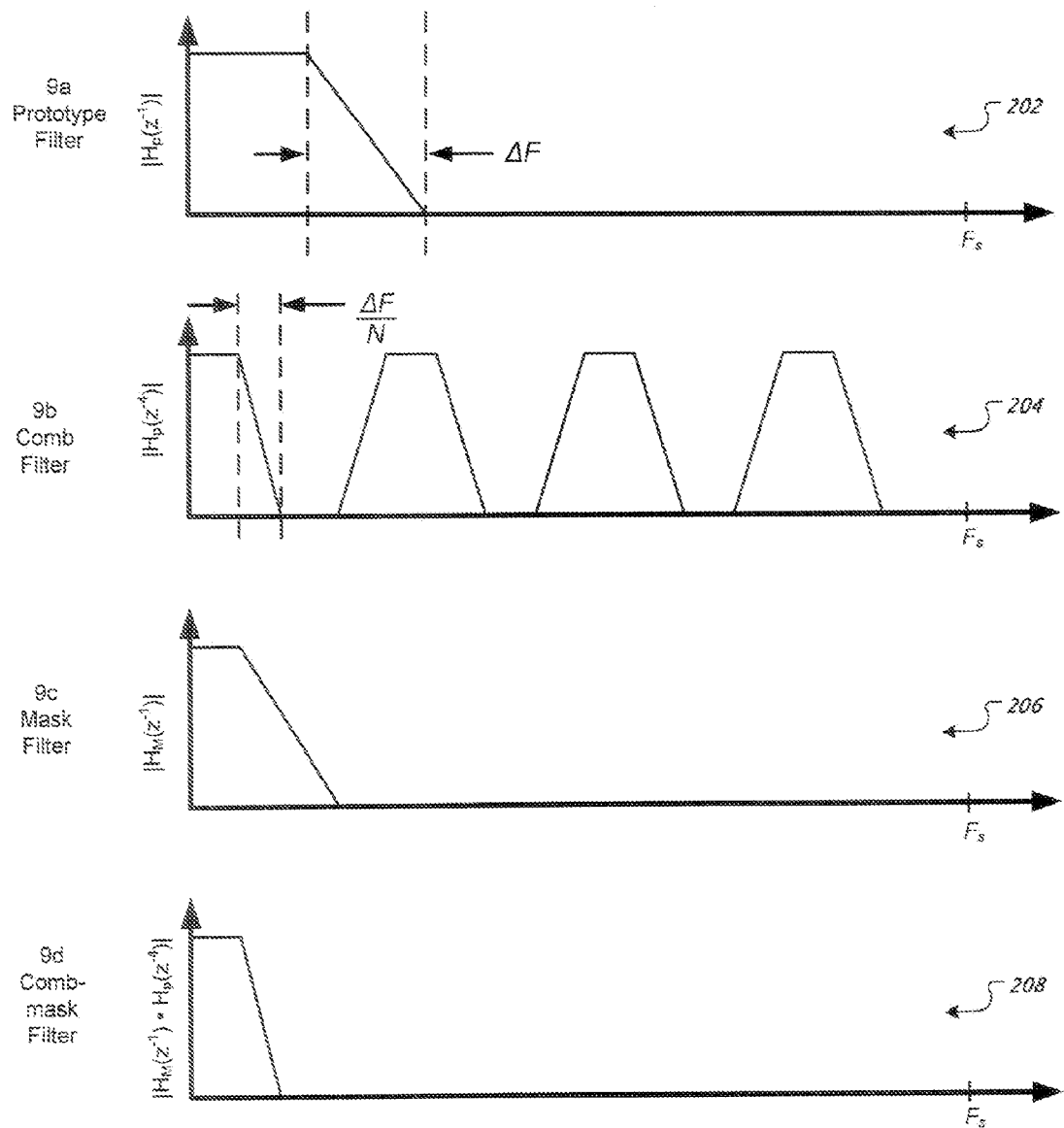
FIG. 2 are example graphs illustrating functions performed on a digital signal by the comb-mask filter of FIG. 1.

FIG. 2 are example graphs 202 and 208 illustrating functions performed on a digital signal by the comb-mask filter 120 of FIG. 1. In this case, the graphs 202 to 208 illustrate the scaling effect on the frequency axis, and this scaling effect can produce a low shape factor with relatively low computational complexity. The graph 202 illustrates a prototype filter with wide transition bands. As discussed in the following pages, a wide transition band (high shape factor) can enable a simple (small group delay) FIR filter design. The graph 204 illustrates a transform the prototype filter into a comb filter. The scaling of the frequency axis by the comb rate, where in this example the comb rate N=4, can result in the transition bandwidth being sealed as well. In this case, while the storage requirements of the filter can increase by a factor of N, the computation requirements in terms of multiplications and additions does not substantially change. The graph 206 illustrates the mask filter. In this case, the mask filter filters out the comb "teeth" that are not desired and passes the channel of interest. Generally, the transition bandwidth of the mask filter can be relatively un-demanding and lead to a simple (low computational complexity) implementation. The graph 208 illustrates the final signal after using a comb filter and a mask filter in combination.

Figure 3:
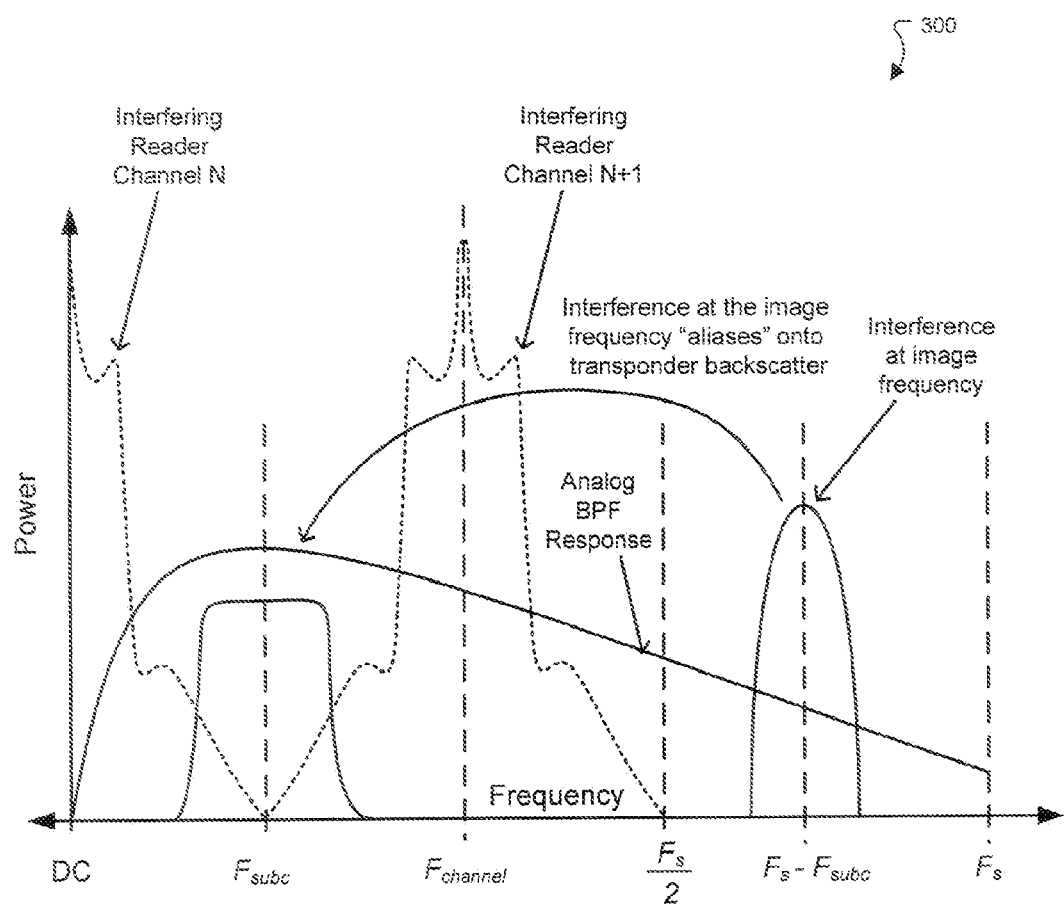
FIG. 3 is an example power spectrum of an example baseband receive signal.

FIG. 3 illustrates an example power spectrum 300 for illustrating the frequency domain power spectrum of an example baseband receive signal. In particular, the spectrum illustrates aliasing distortion and filter transition-band/stop-band requirements associated with receiving processing backscattered signals.

The transformation of continuous time signals to sampled data signals through the sampling process can involve mapping an entire frequency axis onto the frequency axis from $-F_S/2$ to $+F_X/2$ through a modulo-summation process, i.e., $$X_s(f) = \sum_{n=-\infty}^{\infty} X(f + n \cdot F_s).$$

As a result of this mapping processes, limiting the frequency content into the ADC to those frequencies of interest can reduce image frequencies. In the case that interference signals are not sufficiently attenuated by the analog BPF 108, these interfering signals can sum on top of the transponder signal in the mapping processes. These "image frequencies" can be reduced below the required signal-to-noise ratio for the demodulator, typically about 15 dB below the transponder signal.

The image frequencies for a signal at frequency $F_{subc}$ with ADC sampling frequency $F_s$ can be expressed as follows:

$$F_{image} = n \cdot F_s \pm F_{subc}$$

where n is any integer. As indicated in this expression, the larger $F_s$ is, the more spectrally separate the images are on the frequency axis pushing the first image frequency further away from the channel of interest.

Turning to filter time-bandwidth limitations, two measures of energy concentration for a filter response can be defined in two aspects: one in the time domain and one in the frequency domain. The energy concentration of a filter response may be defined in other ways. In the time domain, the group delay can be defined a the derivative of a filter's phase with respect to frequency. Group delay, whose unit of measure is time in seconds, can also be expressed as the propagation time delay of the envelope of an amplitude modulated signal as it passes through a filter. In other words, the group delay can be a rough measure of the filter response span in the time domain.

In the frequency domain, shape factor can be a term used to quantify the steepness of a filter's roll-off. Shape factor is normally defined as the ratio of a filter's stop-band width (typically 60 dB attenuation) plus the transition region width over the pass-band width. The smaller the shape factor value, the steeper the filter's roll-off. For an ideal filter with a transition region of zero width, the shape factor can be unity. Higher shape factor can mean less frequency concentration.

These two measures, group delay and shape factor, define a filter's energy concentration in the time domain and frequency domain, respectively. Though, if a filter is highly concentrated in time (low group delay), then it is not well concentrated in frequency (high shape factor). If a filter is highly concentrated in frequency (low shape factor), then it is not well concentrated in time (high group delay). Finally, high group delay (small shape factor) implies a complex, high order filter. This applies to analog or digital filters.

Figure 4:
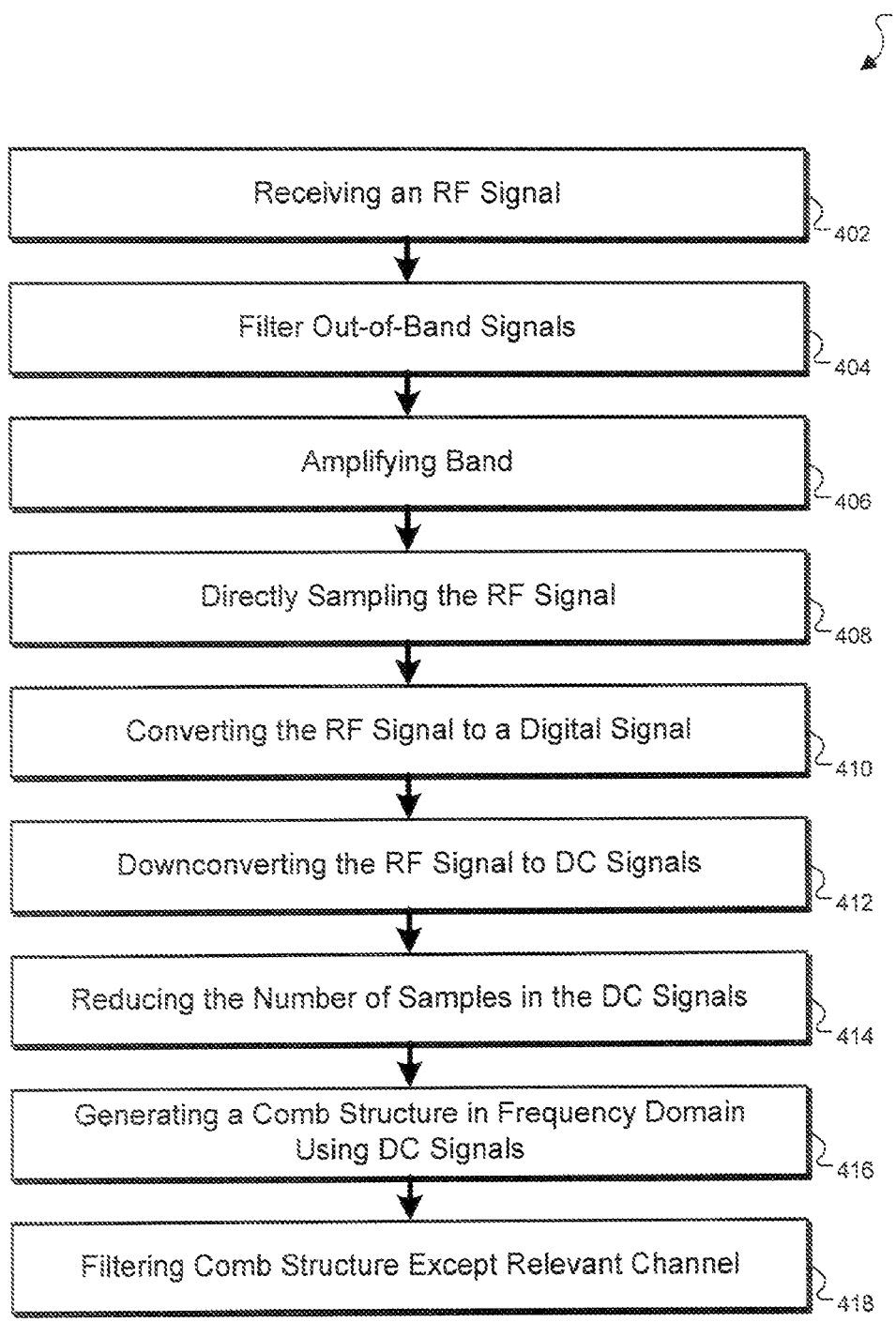
FIG. 4 is a flow chart illustrating an example method for oversampling and digitally filtering RFID signals.

FIG. 4 is a flowchart illustrating an example method 400 for filtering interfering RF signals in the RFID reader 100 of FIG. 1. Generally, method 400 describes an example technique where a received RF signal is over-sampled and filtered using a comb filter and mask filter. System 100 contemplates using any appropriate combination and arrangement of logical elements implementing some or all of the described functionality.

Method 400 begins at step 402 where an RF signal is received. For example, the antenna 106 may receive an RF signal including a desired channel as well as interference from other readers, and the circulator 104 directs the signal to the receiver module 102. At step 404, out-of-band frequencies are substantially rejected and a band of frequencies is passed. Next, at step 406, the relatively low power level of the transponder signal is amplified. In the example, the LNA 110 amplifies the band received from the BPF 108. The RF signal is directly sampled at step 410. Again turning to the example, the ADC 112 can directly sample the RF signal at a sample rate greater than 60 MHz. At step 410, the RF signal is converted to a digital signal. Next, at step 412, the digital signal is downconverted to baseband signals. As for the example, the mixers 114a and 114b in combination with the oscillator 116 can downconvert the digital signal to an in-phase signal and a quadrature signal. The sample rate in the baseband signals are reduced at step 414. Returning to the example, the CIC filters 118a and 118b can function as a decimator reducing the number of samples in the baseband signals. At step 416, a comb structure in the frequency domain is generated based, at least in part, on the baseband signals. Next, at step 418, the comb passbands are filtered out except the channel of interest. As for the example, the comb-mask filters 120a and 120b generate the comb structure in the frequency domain using the baseband signals and filter the structures while passing the relevant channel.

A number of embodiments of the invention have been described. Nevertheless, it will be understood that various modification may be made without departing from the spirit and scope of the invention. For example, instead of directly sampling the RF signal, the received RF signal could be downconverted to baseband by an analog RF mixer followed by baseband analog filtering and then oversampling the baseband analog signals.

What is claimed is:

1. A Radio Frequency (RF) receiver, comprising:
an analog filter receiving an RF signal filtering several frequencies from the RF signal;
an analog-to-digital converter (ADC) coupled to the analog filter operable to convert the filtered signal to a digital signal by directly sampling the filtered RF signal independent of initially downconverting the filtered RF signal;
a comb filter coupled to the ADC and configured to generate a comb structure in a frequency domain using the RF signal; and
a mask filter coupled to the comb filter and configured to pass a frequency band in the comb structure, the comb filter and frequency mask filter operable to filter out-of-band noise in the digital signal.

2. The RF receiver of claim 1, further comprising a conversion module coupled to the ADC and operable to directly sample and down convert the digital signal to baseband signal.

3. The RF receiver of claim 1, wherein the mask filter is operable to pass a channel and substantially reject other structures in a frequency domain generated by the comb filter.

4. The RF receiver of claim 1, wherein the comb filter and the mask filter are integrated into a single comb-mask filter.

5. The RF receiver of claim 4, wherein the single comb-mask filter comprises at least one of a FM0 comb-mask filter, a Miller-2 comb-mask filter, a Miller-4 comb-mask filter, or a Miller-8 comb-mask filter.

6. The RF receiver of claim 1, wherein the RF signal includes a backscattered signal from a transponder.

7. The RF receiver of claim 1, further comprising a decimator operable to decrease a number of samples of the digital signal.

8. The RF receiver of claim 1, wherein the comb filter and the mask filter are operable to decrease a shape factor associated with the digital signal.

9. An RF receiver, comprising:
an ADC operable to directly sample an RF signal independent of a band pass filter and convert the RF signal to a digital signal, wherein the RF signal is sampled at a rate greater than or equal to 60 MHz;
a comb filter coupled to the ADC and configured to generate a comb structure in a frequency domain using the RF signal; and
a mask filter coupled to the comb filter and configured to pass a a frequency band in the comb structure, the comb filter and frequency mask filter operable to filter out-of-band noise in the digital signal.

10. The RF receiver of claim 9, wherein the sample rate is approximately 244 MHz.

11. A method, comprising:
filtering several frequencies from an RF signal and passing an RF band;
directly sampling the RF band for converting the RF band to a digital signal independent of initially downconverting the filtered RF signal;
generating a comb structure in a frequency domain based, at least in part, on the digital signal; and
masking structures in the comb to filter out-of-band noise in the digital signal.

12. The method of claim 11, further comprising down converting the digital signal to a baseband signal.

13. The method of claim 11, wherein masking the comb structure comprises:
passing a channel; and
substantially rejecting other structures in the frequency domain.

14. The method of claim 11, wherein generating the comb structure and masking out-of-band structures is performed by a comb-mask filter.

15. The method of claim 14, wherein the single comb-mask filter comprises at least one of a FM0 comb-mask filter, a Miller-2 comb-mask filter, a Miller-4 comb-mask filter, or a Miller-8 comb-mask filter.

16. The method of claim 11, wherein the RF signal includes a backscattered signal from a transponder.

17. The method of claim 11, further comprising decreasing a number of samples of the digital signal.

18. The method of claim 11, further comprising decreasing a shape factor associated with the digital signal.

19. A method, comprising:
   directly sampling, at a rate greater than or equal to 60 MHz, an RF signal independent of a band pass filter;
   converting the RF signal to a digital signal;
   generating a comb structure in a frequency domain based, at least in part, on the digital signal; and
   masking structures in the comb to filter out-of-band noise in the digital signal.

20. The method of claim 19, wherein the sample rate is approximately 244 MHz.

* * * * *

UNITED STATES PATENT AND TRADEMARK OFFICE
CERTIFICATE OF CORRECTION

| | | |
|---|---|---|
| PATENT NO. | : 7,873,121 B2 | Page 1 of 1 |
| APPLICATION NO. | : 11/741651 | |
| DATED | : January 18, 2011 | |
| INVENTOR(S) | : Thomas J. Frederick | |

It is certified that error appears in the above-identified patent and that said Letters Patent is hereby corrected as shown below:

In Claim 1, delete "signal:" and insert -- signal; --, therefor.

In Claim 9, delete "a a frequency" and insert -- a frequency --, therefor.

Signed and Sealed this
Twenty-ninth Day of March, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,873,121 B2 |
| APPLICATION NO. | : 11/741651 |
| DATED | : January 18, 2011 |
| INVENTOR(S) | : Thomas J. Frederick |

It is certified that error appears in the above-identified patent and that said Letters Patent is hereby corrected as shown below:

In Claim 1, Column 7, lines 66-67, delete "signal:" and insert -- signal; --, therefor.

In Claim 9, Column 8, line 39, delete "a a frequency" and insert -- a frequency --, therefor.

This certificate supersedes the Certificate of Correction issued March 29, 2011.

Signed and Sealed this
Third Day of May, 2011

David J. Kappos
*Director of the United States Patent and Trademark Office*